(12) United States Patent
Gupta et al.

(10) Patent No.: US 12,711,517 B2
(45) Date of Patent: Aug. 18, 2026

(54) USER SEGMENTATION USING PREDICTIVE MODEL INTERPRETATION

(71) Applicant: Adobe Inc., San Jose, CA (US)

(72) Inventors: Piyush Gupta, Uttar Pradesh (IN); Nikaash Puri, New Delhi (IN)

(73) Assignee: Adobe Inc., San Jose, CA (US)

( * ) Notice: Subject to any disclaimer, the term of this patent is extended or adjusted under 35 U.S.C. 154(b) by 1387 days.

(21) Appl. No.: 15/816,480

(22) Filed: Nov. 17, 2017

(65) Prior Publication Data

US 2019/0156231 A1 May 23, 2019

(51) Int. Cl.
*G06Q 30/0202* (2023.01)
*G06N 5/022* (2023.01)
*G06N 7/01* (2023.01)

(52) U.S. Cl.
CPC ......... *G06Q 30/0202* (2013.01); *G06N 5/022* (2013.01); *G06N 7/01* (2023.01)

(58) Field of Classification Search
CPC ............................... G06N 7/005; G06N 5/022
See application file for complete search history.

(56) References Cited

U.S. PATENT DOCUMENTS

| | | | | |
|---|---|---|---|---|
| 9,065,727 | B1 * | 6/2015 | Liu | H04L 43/04 |
| 2016/0019587 | A1 * | 1/2016 | Hueter | G06Q 10/04 705/14.53 |
| 2018/0308010 | A1 * | 10/2018 | Bunch | G06N 5/01 |

OTHER PUBLICATIONS

Zhou et al. “Pattern based sequence classification.” IEEE Transactions on knowledge and Data Engineering 28.5 (2015): 1285-1298 (Year: 2015).*

Tsai, Chih-Fong et al., “Variable selection by association rules for customer churn prediction of multimedia on demand.” Expert Systems with Applications 37.3 (Year: 2010).*

Carvalho, Deborah R., and Alex A. Freitas. “A hybrid decision tree/genetic algorithm method for data mining.” Information Sciences 163.1-3 (Year: 2004).*

Ma, Haiying. “A Study on Customer Segmentation for E-commerce Using the Generalized Association Rules and Decision Tree.” American Journal of Industrial and Business Management 5.12 (Year: 2015).*

(Continued)

*Primary Examiner* — Adam C Standke
(74) *Attorney, Agent, or Firm* — Kilpatrick Townsend & Stockton LLP

(57) ABSTRACT

Systems and methods are disclosed herein for determining user segments created by a predictive model based on user behavioral data. A data analysis application executing on a computing device receives training data and a user input defining an outcome of interest. The data analysis application trains a predictive model with the training data and the outcome of interest. The data analysis application generates input data for each of a set of conditions determined from the training data. The data analysis application receives predicted outcome from the predictive model based on the input data. The data analysis application determines the relevance of the condition based on a comparison of the predicted outcome and the outcome of interest. The data analysis application generates a user segment that comprises a condition from the set of conditions based on the relevance of the condition.

20 Claims, 6 Drawing Sheets

(56) References Cited

OTHER PUBLICATIONS

Lakkaraju, Himabindu, Stephen H. Bach, and Jure Leskovec. "Interpretable decision sets: A joint framework for description and prediction." Proceedings of the 22nd Acm Sigkdd international conference on knowledge discovery and data mining. (Year: 2016).*

Zhou et al. "Pattern based sequence classification." IEEE Transactions on knowledge and Data Engineering 28.5 (Year: 2015).*

Cook, R. Dennis, et al., "Residuals and Influence in Regression", Chapman and Hall, New York, 1982, retrieved from University of Minnesota Digital Conservancy, http://hdl.handle.net/11299/37076, 237 pages.

Fisher, R. A., The Use Of Multiple Measurements In Taxonomic Problems, Annals of Eugenics, 7: 179-188, Sep. 1936, doi: 10.1111/j.1469-1809.1936.tb02137.x, 10 pages.

Fidelis, M.V., et al., "Discovering Comprehensible Classification Rules With a Genetic Algorithm", Evolutionary Computation, 2000, Proceedings of the 2000 Congress on vol. 1, IEEE Xplore Aug. 6, 2012, 6 pages.

Ghosh, Sournadip, et al., "Mining Frequent Itemsets Using Genetic Algorithm", International Journal of Artificial Intelligence & Applications, vol. 1, No. 4, Oct. 2010, arXiv:1011.0328, 11 pages.

Himabindu Lakkaraju, et al., "Inter-Pretable Decision Sets: A Joint Framework For Description And Pre-Diction," In Proceedings of the 22nd ACM SIGKDD International Conference on Knowledge Discovery and Data Mining, ACM, 2016, 10 pages.

Lundberg, Scott, "An Unexpected Unity Among Methods for Interpreting Model Predictions", NIPS 2016 Workshop on Interpretable Machine Learning in Complex Systems, arXiv:1611.07478, Nov. 22, 2016, revised Dec. 8, 2016, 6 pages.

Letham, Benjamin, et al., "Interpretable Classi_Ers Using Rules And Bayesian Analysis: Building A Better Stroke Prediction Model" the Annals of Applied Statistics, arXiv:1511.01644, 2015, vol. 9, No. 3, 23 pages.

Ribeiro, Marco Tulio, "Why Should I Trust You?: Explaining The Predictions Of Any Classifier", In Proceedings of the 22nd ACM SIGKDD International Conference on Knowledge Discovery and Data Mining, ACM 2016, 10 pages.

* cited by examiner

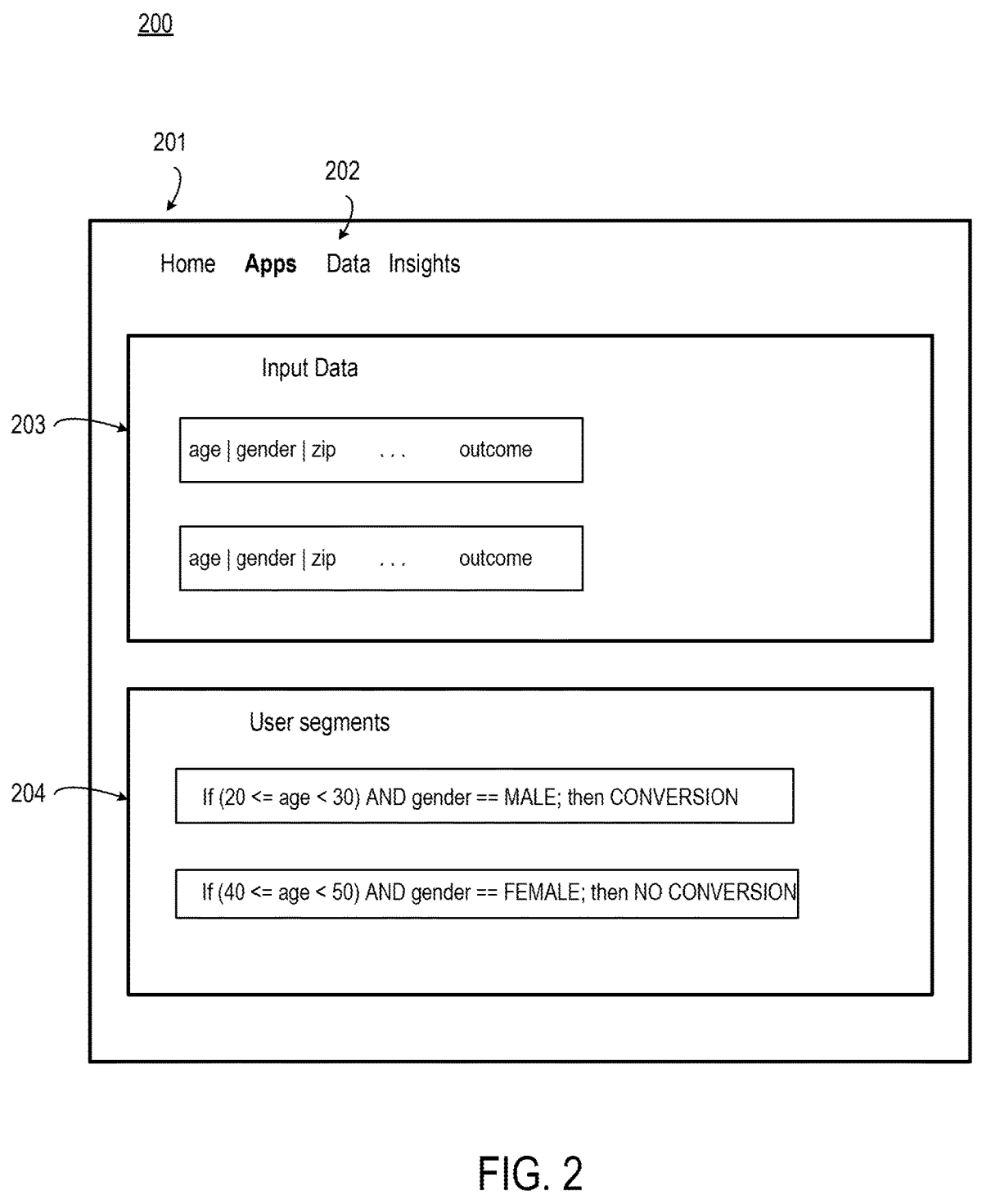

200

201

202

Home Apps Data Insights

203

Input Data age | gender | zip . . . outcome age | gender | zip . . . outcome

204

User segments

If (20 <= age < 30) AND gender == MALE; then CONVERSION

If (40 <= age < 50) AND gender == FEMALE; then NO CONVERSION

FIG. 2

USER SEGMENTATION USING PREDICTIVE MODEL INTERPRETATION

TECHNICAL FIELD

This disclosure relates generally to artificial intelligence in data analysis. More specifically, but not by way of limitation, this disclosure relates to determining conditions for a predictive model to predict outcomes from user interaction data and presenting resulting user segments to an end user to provide insight into the relevant parameters for the predictive model to generate a user segmentation.

BACKGROUND

Computing systems can help operators better understand user behavior and thereby enable the delivery of better targeted content, products, and services to users. For example, a computing system can predict whether a user will perform a desired outcome, such as whether a user conversion will occur when the user is exposed to targeted content. With the results of the prediction, an operator can configure a computing system to send relevant targeted content to user devices.

Many computing systems use predictive models, such as neural networks, that are trained to predict the likelihood of the desired outcome (e.g., the user conversion) based on a set of user-related data points. Although such models can provide accurate predictions, they do not provide insights about the most relevant user attributes that biased the prediction. For example, a neural network includes multiple hidden layers that extract features from user-related data points and generates the prediction based on the features. Typically, the computing system does not present these features to the operator. Even if the computing system were to present the features to the operator, the features would not be interpretable. Instead, the features are simply numerical representations of the user-related data that are interpretable only by the neural network.

Consequently, the computing system does not provide any insights about the important attributes that biased the predictive model to predict a certain outcome. Without such insights, the quality of computing services and the utilization of resources cannot be improved. Although the operator can understand that the desired outcome is obtained for a particular user, the operator would not understand the reasons that the computing system predicted the outcome. Specifically, the operator does not know the relevant user attributes.

Without such knowledge, setting up the computing system to perform various actions such as providing targeted content can be challenging. As such, the operator may not be able to properly configure the computing system without knowledge about the relevant data that results in a particular prediction. For instance, the operator does not know that the type of web browser, operating system, and location are important user attributes that result in the particular prediction (e.g., user conversion). Hence, the operator is not able to use these three attributes as controls for a computing system to select and send relevant content. Instead, the computing system would run the predictive model for every user to receive a prediction and determine whether targeted content should be sent.

Accordingly, solutions are needed to help understand the insights about how predictive models predict outcomes.

SUMMARY

Systems and methods are disclosed herein for determining user segments created by a predictive model based on user behavioral data. A data analysis application executing on a computing device receives training data and user input. The training data comprises a plurality of instances, each instance associated with a user interaction within a computer network and comprising a plurality of attributes and an outcome associated with the user interaction, and an operator input defining an outcome of interest. The data analysis application generates a set of conditions from the training data. Each condition comprises an attribute and a range of values for the attribute. The data analysis application determines a relevance for each condition from the set of conditions to the outcome of interest. The data analysis application generates input data from the training data. The data analysis application receives predicted outcome from the predictive model based on the input data. The data analysis application determines the relevance of the condition based on a comparison of the predicted outcome and the outcome of interest. The data analysis application generates a user segment that comprises a condition from the set of conditions based on the relevance of the condition. The data analysis application presents the user segment to the operator at an interface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 2 depicts an example user interface for a system configured to determine user segments created by a predictive model based on user behavioral data, according to certain embodiments of the present disclosure.

DETAILED DESCRIPTION

Figure 1:
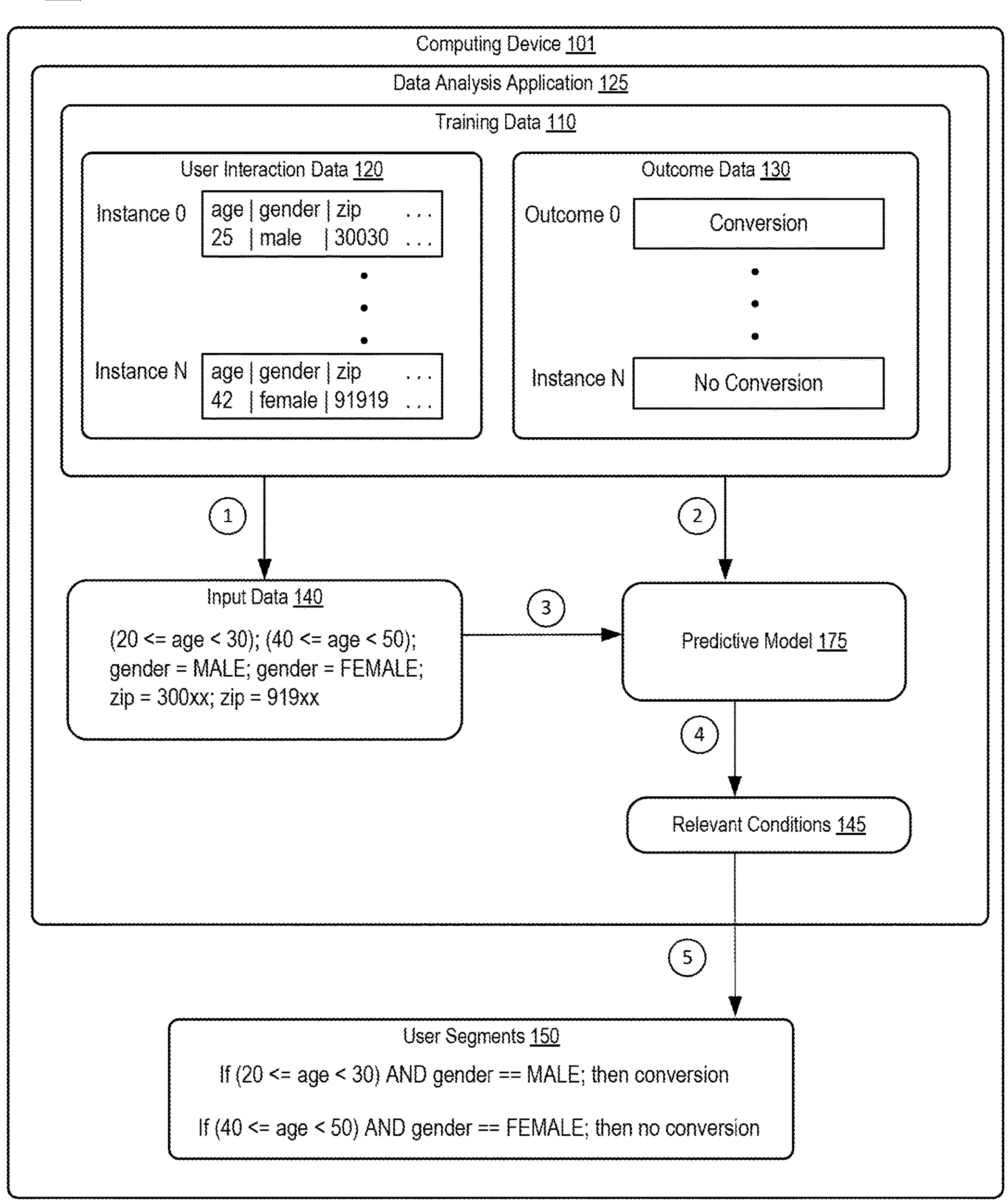
FIG. 1 is a diagram depicting an example computing device for determining user segments created by a predictive model based on user behavioral data, according to some embodiments.

Embodiments of the present disclosure include systems and methods for determining and presenting valuable insights related to predictions by predictive models. In existing systems, a predictive model typically generates a predicted outcome but does not present insights about the reasons for the prediction. In comparison, the present embodiments still use the predictive model while also supplementing the prediction with the insights.

In an example, the insights are presented as user segments, where a user segment includes conditions about user-related data. When the conditions of a particular user segment are met, the predictive model is typically biased to generate a particular prediction. Hence, when the computing system presents a particular prediction and user segment to an operator, valuable knowledge is gained about the most relevant user-related data that biased this particular prediction.

To illustrate and referring back to the example of a neural network as a predictive model, the neural network is trained to output a likelihood of a user conversion. During training, data about a user accesses to web sites is provided as input to the neural network. This data includes for each user, for instance, the user's location, age, and gender, the operating system (OS) and browser of the user's device, and other user-related data. Accordingly, the hidden layers of the neural network are trained to extract features from the data and the neural network is trained to interpret these features and predict likelihoods of user conversion. In addition, the training data is further analyzed to determine the most relevant user attributes that are associated with these likelihoods. For example, a determination is made that when the user's location is California, age is between twenty and thirty, and the OS is Windows, the neural network is biased to predict a high likelihood of conversion. These user attributes are set as a user segment and are presented with an indication that the neural network will predict a user conversion when these user attributes are present. Hence, an operator can configure a computing system such that any time data about access of a user to a web site indicates that the user is California, is aged between twenty and thirty, and uses Windows OS, targeted content is inserted in a space of the web site.

In an example embodiment, to generate the user segment, an analysis is performed about the user attributes determined to be relevant to the predictive model. For example, a data analysis application executing on the computing system generates a list of conditions from training data of the predictive model. To assess the relevance of each condition, the data analysis application generates input data that corresponds to a set of observations from the training data where the condition is met. Next, the data analysis application provides the input data to the predictive model and receives a predicted outcome. The data analysis application determines the relevance of the condition based on the predicted outcome. For instance, the condition is relevant if the predicted outcome matches an outcome of interest. Otherwise, the condition is irrelevant.

From the relevant conditions, the data analysis application determines user segments. A user segment is a group of users that, based on their meeting a condition are likely to perform a certain action, such as click on targeted content on a website. For example, a user segment could be 20<=age<30; gender=male; location=California or Washington; Operating System=Windows. The data analysis application may generate a set of user segments using an iterative process. For example, the data analysis application randomly generates an initial set of user segments, each containing a number of relevant conditions. Then, the data analysis application assesses the relevance of each user segment by using a similar approach as to assessing the relevance of a condition, eliminates irrelevant user segments, combines the relevant user segments to create new ones, and iteratively repeats the process for a number of iterations. Once the iterations are performed, the final set of user segments includes the segments that are most relevant for generating a prediction. The computing device presents the user segments to the operator.

Embodiments of the present disclosure provide many technical advantages over existing systems. For example, user segments can be used to control operations of a computing system in a more efficient manner relative to merely relying on a predictive model. To illustrate and referring back to the example of a neural network used for targeted content, existing systems would train the neural network to predict a user conversion. Thereafter, any time data is observed about access of a user to a website, this data is input to the neural network and a prediction is received. Based on the prediction, targeted content can be sent to the user's device. In comparison, embodiments of the present disclosure enable the use of the user segments as control parameters. In particular, a computing system can be configured to send the targeted content to the user's device any time the data about the user's access shows that the conditions of a particular user segment are met (e.g., the user is in California, aged between twenty and thirty, and uses Windows OS). In this way, the neural network need to be used to determine whether the targeted content should be sent or not. Hence, the computational burden (e.g., processing and memory usage) for using the neural network can be avoided and the determination can be made in a quicker and more efficient manner.

As used herein, "predictive model" refers to a model that can predict future outcomes based on past data. For example, a predictive model can predict an outcome for a given set of input attributes. Predictive models can include neural networks, regression models, decision trees, among others.

As used herein, "user segment" refers to determined segment of users for whom the prediction model determines the same outcome. For example, the user segment of "Name: John; Age: 25; Residence: California" could be "did not convert," or "did not respond to targeted content." A user segment can also be referred to herein as a class or a rule.

As used herein, "training data" refers to a collection of user interactions with known outcomes used to train a predictive model. For example, one instance of training data could be a 20-year old female who resides in Georgia and responded to targeted content.

As used herein, "instance" refers to data about one user interaction with a website or system. For example, an instance of user interaction data is generated when a user visits a website. For example, an instance may be "Name: John, Age: 25, Residence: California, Cookie 0x192, IP address 170.1.2.11, etc."

As used herein, a "condition" is an attribute of a user interaction and a range of values that the attribute is permitted to take. For example, a condition could be "20 <=age<30." A relevant condition is a combination of certain attributes within certain ranges that bias or affect the predictive model more than another combination. When the model outputs a prediction, the operator can understand the relevant conditions, i.e., the conditions that affected the model's output. For example, a condition such as a user's age may weigh heavily a prediction of the outcome.

As used herein, "attribute" refers a category of data in an instance. For example, name, age, and residence can be attributes.

Turning now to the figures, FIG. 1 is a diagram depicting an example computing device for determining user segments created by a predictive model based on user behavioral data, according to some embodiments. In the example depicted in FIG. 1, a user executes the data analysis application 125 on the computing device 101. A user interacts with computing device 101. The data analysis application 125 trains the predictive model 175 with the training data 110. The data analysis application 125 receives the desired outcome of interest from the operator. The data analysis application 125 generates insights about how the trained model generates predictions. These insights are presented to the user. From this point, the operator can start using the predictive model in the manner desired with a better understanding of the insights generated by the model.

FIG. 1 also illustrates an example set of operations performed by the computing device. More specifically, at step 1, the data analysis application 125 receives as input the training data 110, which includes user interaction data 120 and outcome data 130. User interaction data 120 includes instances of user interaction data. User interaction data 120 can be, for example, the interactions of various users with a particular website. For example, an instance of user interaction data can be demographic data such as age or gender; device data such as location, wireless network name, or login; or content data such as what the user viewed and clicked on with respect to a particular web site. User interaction data 120 can also include a user ID, or visitor ID component. As shown in FIG. 1, figure instance 0 of user interaction data 120 shows that a particular user had the attributes age=25, gender=male, and zip=30030. Instance N, representing another user, shows age=42, gender=female, and zip=91919. Other information can include, for example, where the user clicked on the website, other websites the user visited, how long the user remained on the site, etc.

The data analysis application 125 matches the instances of user interaction data 120 with the corresponding instances of the outcome data 130. The outcome data 130 contains data representing whether the outcome of interest occurred. For example, as shown, the outcome of interest may be whether a user was converted. Outcome data 130 includes instances which indicate conversion or no conversion. As shown in FIG. 1, outcome 0, corresponding to the instance 0 of data in user interaction data 120, shows that the user made was converted. Outcome N, corresponding to instance N of user interaction data 120, shows that the corresponding user was not converted.

At step 2, the data analysis application 125 causes the training data 110 to be provided the predictive model 175 and trains the predictive model 175. With the training data 110, the predictive model 175 is able to predict the outcome of unseen user interaction data. Each instance of training data contains known attributes and the corresponding known outcome. For example, during training a neural network, the parameters are updated such that the neural network can predict the known outcome from the known attributes. The outputs are assigned the correct values corresponding to the particular outcome. Internal error terms are adjusted to adjust weights in hidden layers so that the network determines the correct output during the next iteration of training.

At step 3, the data analysis application 125 generates input data 140 from the training data 110, to determine the conditions relevant to the predictive model 175 in determining an outcome for each particular data input. The data analysis application 125 isolates conditions from the training data 110 and creates input data 140.

For example, as shown in FIG. 1, the data analysis application 125 has determined, from the user interaction data 120 and outcome data 130, that an initial set of conditions is 20<=age<30, 40 <=age<50, gender=male, gender=female, zip=300xx, and zip=919xx. The data analysis application 125 creates input data for each of these conditions and separately provides each input data instance to the predictive model 175.

At block 4, the data analysis application 125 determines a set of relevant conditions 145 from the input data 140. The data analysis application 125 determines whether each condition is relevant to the predicted outcome by providing each condition to the predictive model 175. More specifically, based on the outcomes from the predictive model 175 of each input data instance, the data analysis application 125 determines the relevance of each condition. Conditions which are determined to not be relevant, i.e., contributing in a significant manner to the outcome, may not be placed in the relevant conditions 145.

At step 5, with a list of relevant conditions, the data analysis application 125 creates user segments 150 based on the relevant conditions 145. For example, as shown in FIG. 1, the data analysis application 125 has determined that the condition 20<=age<30 combined with gender=male results in the desired outcome (e.g., a conversion), whereas the condition 40<=age<50 AND gender=female does not result in the desired outcome (no conversion). The resulting user segments 150 are useful for the operator to understand how the predictive model 175 works and which conditions are useful. For example, as shown in FIG. 1, the data analysis application determined that attribute of zip code makes no difference to the outcome.

Accordingly, with a trained predictive model 175, the data analysis application 125 provides insights to the user. With the insights, the user, such as an operator, may deploy the predictive model 175. The predictive model 175 predicts for the operator a user conversion for a user segment. The operator can thereby understand why one user segment would have a better conversion than another user segment. The operator launches a marketing campaign with the insights from the predictive model 175. The predictive model 175 is therefore used in real time to decide whether to insert targeted content for a particular user given the predicted outcome based on the attributes of the user's interaction The computing device 101 is shown including a predictive model 175, but the predictive model 175 may be executed on another computing device, i.e., communicating over a network. The predictive model 175 can be a machine learning model, neural network, random forests, decision trees, or other suitable model.

FIG. 2 depicts an example user interface for a system configured to determine user segments created by a predictive model based on user behavioral data, according to certain embodiments of the present disclosure. The data analysis application 125 can receive inputs from the operator and display the results of the analysis via a graphical user interface 201. Graphical user interface 201 includes a menu 202 that shows tabs such as "Home," "Apps," "Data," and "Insights." Other menus are possible.

Input data view 203 shows the data input to the model, such as input data 140 developed by the data analysis application 125 from the training data 110. The operator can thereby view the data being used by the model. Similarly, the user segments view 204 shows the results provided by the data analysis application 125, specifically the determination that the condition 20<=age<30 combined with gender=male results in the desired outcome (e.g., a conversion), whereas the condition 40<=age<50 AND gender=female does not result in the desired outcome (no conversion).

Method 300 provides an example method that the data analysis application 125 may use to analyze a predictive model. Each operator has his/her own trained model. Each time the operator uploads new data, the model is trained/retrained using the new data and the operator's outcome of interest.

In some embodiments, a natural language processor is used to determine the operator's natural language input. For example, an operator provides an outcome of interest in the form of a question to the data analysis application 125, such as "users from 40 to 50 accessing the website on an iPhone." In this case, the data analysis application 125 interprets the natural language question and determines the outcome data 130 accordingly.

Figure 3:
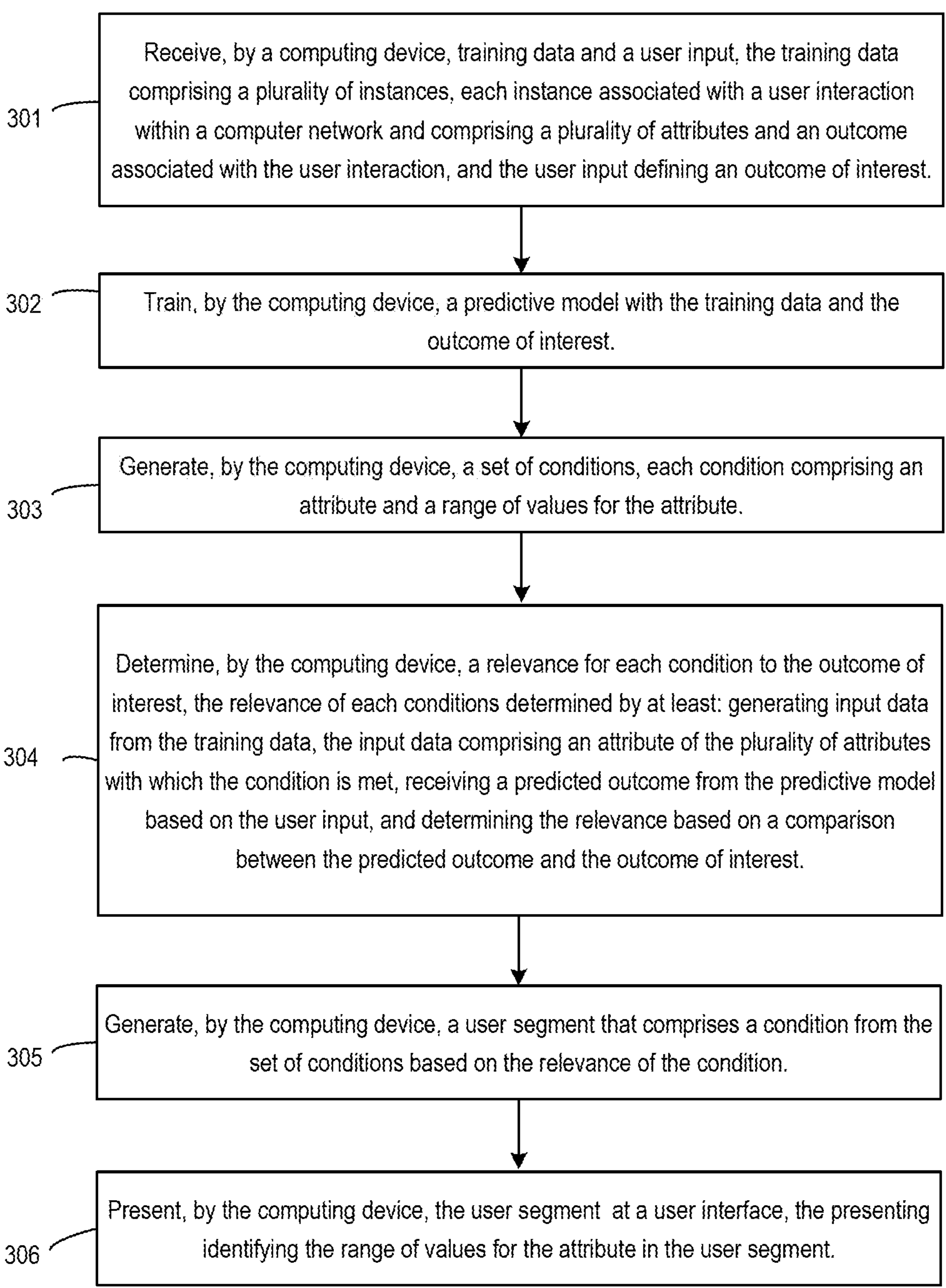
FIG. 3 depicts an example of a process for determining user segments created by a predictive model, according to certain embodiments of the present disclosure.

FIG. 3 depicts an example of a process for determining user segments created by a predictive model, according to certain embodiments of the present disclosure. Other methods of predictive model interpretation are possible, such as decision trees or instance level model interpreters such as LIME (local interpretable model-agnostic interpretations).

More specifically, in method 300, the data analysis application 125 determines conditions, each condition including an attribute and a range of permissible values, generates input data corresponding to each determined condition, receives the predicted outcome from the predictive model 175, and determines the relevance of the condition.

At block 301, method 300 involves receiving, by a computing device, training data and a user input. As discussed, training data 110 includes user interaction data 120 and outcome data 130. Each instance of user interaction data 120 includes attributes about the user represented by the data. User interaction data 120 may include demographic data, device data, or other interaction data from a particular user. For example, an instance of user interaction data 120 could be that a user with ID 0014 logged on at 12:01 PM Oct. 5, 2017, was using an iPhone, and spent 32 minutes browsing a web page before navigating away from the web page.

Outcome data 130 includes instances of outcomes, each matching a corresponding instance of user interaction data 120. The outcome data 130 represents an outcome of interest to the operator. For example, an outcome can be whether the user clicked on targeted content on a website.

The data analysis application 125 aggregates the user interaction data 120 and the outcome data 130 to form the training data 110 by pairing instances of user interaction data with the outcome that occurred. The resulting training data 110 therefore includes the outcome associated with each user interaction In some embodiments, with large data sets, a distributed computing system may be used to generate the training data 110 from the user interaction data 120 and outcome data 130.

At block 302, method 300 involves training, by the computing device, a predictive model with the training data and the outcome of interest. Once trained with the training data 110, the predictive model 175 can predict an outcome for an input based on exposure to the training data. Various kinds of predictive models can be used, such as classification models or regression models. Classification models are trained to answer questions with a discrete set of answers, e.g. "yes," or "no," or "a," or "b." Regression models are trained to predict a continuous range of values, such as "what kind of users provide higher revenue."

Because each instance of training data contains known attributes and the corresponding known outcome, the predictive model, regardless of its type, learns to predict outcomes. More specifically, during training, the model is updated by tuning various parameters in order to predict outcomes from known values. With these parameters set, the model is able to predict outcomes based on future data. With a trained predictive model obtained at block 302, the data analysis application 125 analyzes the model and gains insights.

At block 303, method 300 involves generating, by the computing device, a set of conditions from the training data, each condition comprising an attribute and a range of values for the attribute. As discussed, the data analysis application 125 seeks to understand the predictive model by isolating conditions and determining the predicted output from the predictive model 175 when the input condition is met. The data analysis application 125 determines is a list of conditions, or instance-level conditions. The list of conditions are used to determine the input data 140 at block 304.

Each condition includes a categorical feature and a value (for a categorical feature such as state of residence) or a numerical value and a permitted range of values (for a numerical feature such as age). For example, a condition could be "visited the web page two or more times." A condition could also be a GPS location within a range of latitude and longitude values.

In some embodiments, the data analysis application 125 preprocesses the data to translate numerical features into categorical data. Numerical features are binned. For example, the data analysis application 125 may determine that the attribute age is split into ranges 10<=age<25; 25<=age<60; and 60<=age<=85. The data analysis application 125 then determines the range for a numerical value and replaces the numerical value with the category representing the range. For example, an age value of 15 is replaced with a category indicating 10<=age<25. After this preprocessing step, the input data includes only categorical features.

Figure 4:
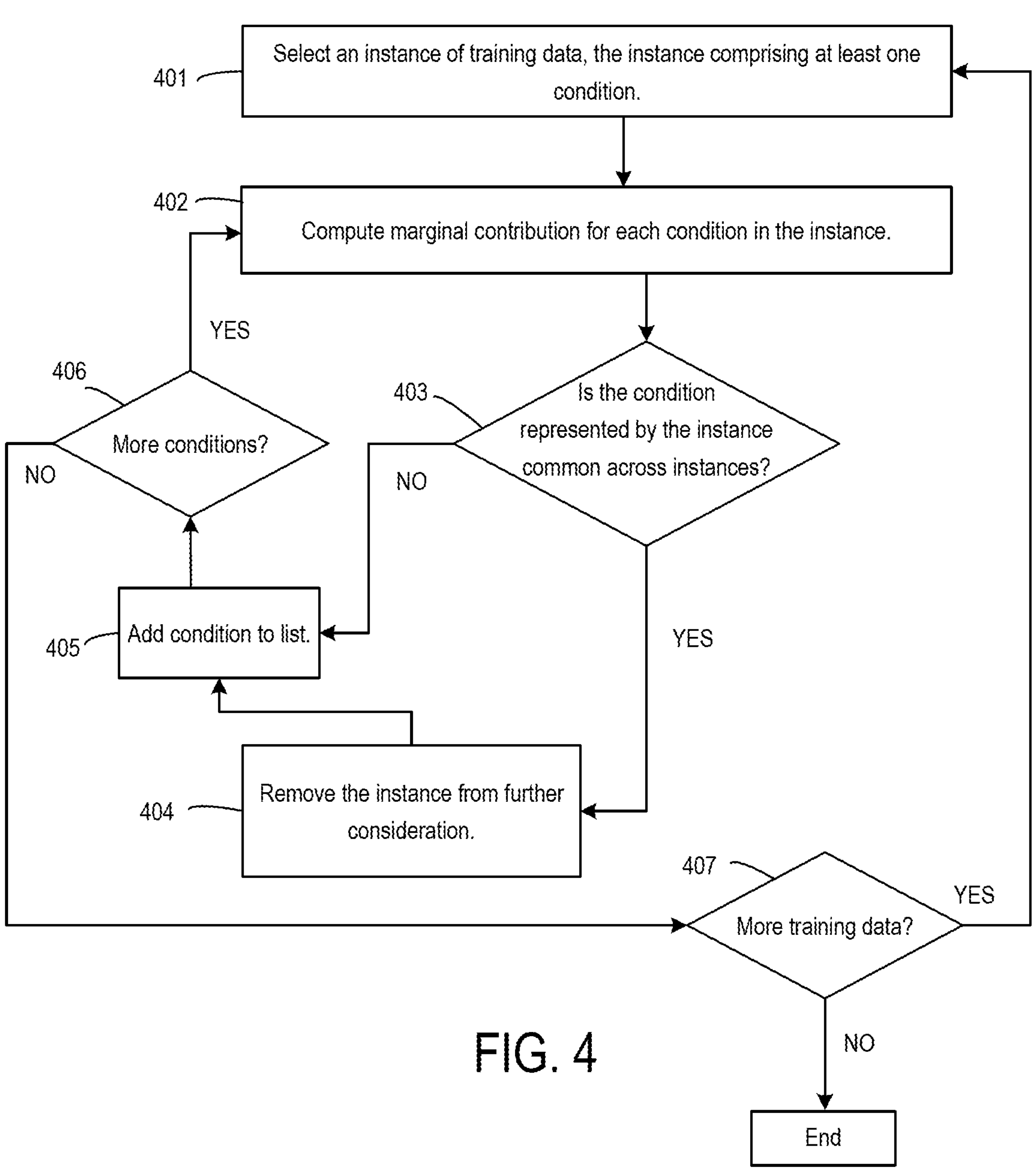
FIG. 4 depicts an example of a process for determining conditions used to determine user segments created by a predictive model, according to certain embodiments of the present disclosure.

Different methods can be used for determining which conditions to include on the list of conditions. An exhaustive method can be used, in which the data analysis application 125 attempts each condition present in each instance of training data. But with large data sets, such an approach is not an effective use of computing resources. Because some conditions may repeat across instances of training data, the data analysis application 125 may not use an input data with a certain condition if another input data with the same condition is available in the data set. This speeds up computation. For example, FIG. 4 shows one method of determining conditions.

At block 304, method 300 involves determining, by the computing device, a relevance for each condition to the outcome of interest. With the list of conditions to be used generated in block 303, the data analysis application 125 determines the relevance of each condition to the output of the predictive model 175. With a list of relevant conditions used by the predictive model 175, the data analysis application 125 can later determine relevant user segments.

More specifically, the data analysis application 125 generates input data from the training data, receives a predicted outcome based on the input data, and determines the relevance of the condition represented by the input data.

The data analysis application 125 generates input data from the training data for the conditions being examined, i.e., each instance of input data corresponds to an isolated condition or set of conditions to be examined. For example, a given instance of training data could include three attributes, e.g., age, gender, and location, with and corresponding ranges, e.g., 20<=age<30, gender=male, and location=California, and an outcome such as "responded to targeted content." For this instance of training data, the data analysis application 125 generates input data for three conditions: a first condition whereby 20<=age<30; a second condition whereby gender=male; and a third condition whereby location=California.

The resulting list of conditions generated at block 303 can be large. Various methods may be used to speed up this process. Conditions obtained from different instances of training data may be duplicative. For example, multiple instances of training data may include the condition gender=female. Accordingly, the data analysis application 125 does not add this condition to the condition list more than once. Additionally, the data analysis application 125 may not use all the conditions obtained at block 303 in order to reduce the complexity of the process.

The data analysis application 125 provides the input data to the predictive model. For example, the data analysis application 125 provides an instance of input data corresponding to a particular condition to the predictive model.

The data analysis application 125 receives a predicted outcome from the predictive model based on the user input data. More specifically, the predictive model 175 provides an output, e.g., conversion or no conversion. More specifically, the predictive model provides an output of probabilities, such as (X, Y) where Y is the probability of the outcome being in a first class and Y is the probability of the outcome being in a second class. For example, the data analysis application 125 provides input data gender=male to the predictive model 175. The data analysis application 125 receives an output (0.69, 0.31), meaning that the probability of conversion is 0.69 and the probability of no conversion is 0.31.

The data analysis application 125 determines the relevance of the condition based on a comparison between the predicted outcome and the outcome of interest. The data analysis application keeps relevant conditions and disregards irrelevant conditions. The relevance of the condition is based on whether the predicted outcome matches the outcome of interest, e.g., if the condition gender=male resulted in no-conversion, but the outcome of interest is conversion, then the data analysis application may consider the condition to be irrelevant.

The relevance of a particular condition can be determined in different ways, for example, the data analysis application 125 can examine conditions in isolation or in combination with other conditions. For example, relevance can be determined by a threshold, e.g., if the probability of the outcome based on the input data instance representing the condition results is greater than a threshold, then the condition is relevant. For example, the data processing application may determine that for a combination of conditions, e.g., 20<=age<30, gender=male, and residence=California, that California has a small contribution in the event that the predictive results are the same or similar without the condition residence=California present.

Alternatively, the data analysis application 125 may require that the condition result in a high likelihood of conversion, e.g., 90%. The data analysis application may also use ranges, for example, by assigning 80% as a "high probability," 60-79% as "medium probability," and 59% and lower as irrelevant.

At block 305, method 300 involves generating, by the computing device, a user segment that comprises a condition from the set of conditions based on the relevance of the condition. Given the sets of conditions determined at block 304, the data analysis application 125 generates user segments. For example, a user segment could be defined as visitors to a website who are under 25, using Facebook, and using an iPhone will follow targeted content on the website.

Different methods of implementing the operations of block 305 are possible. For example, as shown with respect to FIG. 5, a genetic algorithm can be used. Alternatively, as discussed further herein, a greedy select algorithm or a dynamic programming approach can be used.

At block 306, method 300 involves presenting, by the computing device, the user segment at a user interface, the presenting identifying the range of values for the attribute of the condition in the user segment. With user segments determined, the data analysis application 125 displays the segment details to the user, for example, on user segments view 204 as shown in FIG. 2. More specifically, the data analysis application 125 shows, for each user segment, the ranges of permitted attribute values for each condition in the user segment.

In other embodiments, a second, or surrogate, model can be used to determine insights of a predictive model. For example, a second model such as decision tree can be trained with the output that is obtained from the predictive model. In this way, the decision tree implements the steps described with respect to method 300 to determine and present the insights into the predictive model.

As discussed, the data analysis application 125 determines a user segment from relevant conditions. FIG. 4 depicts an example of a process for determining conditions used to determine user segments created by a predictive model, according to certain embodiments of the present disclosure. FIG. 4 can be used, for example, to perform functions described at block 303 of method 300.

At block 401, method 400 involves selecting an instance of training data comprising at least one condition. As discussed, an instance of training data 110 contains one or more conditions. Each condition makes some contribution, however large or small, to the outcome, specifically the determination of whether the outcome of interest occurred. The data analysis application 125 processes the training data 110 and determines the contribution for each condition.

At block 402, method 400 involves computing the relevance of for each condition in the instance of training data. The data analysis application 125 can determine the relevance for each condition in the training data separately.

At block 403, method 400 involves determining whether the condition represented by the instance of training data is common across instances of training data. Different thresholds can be used. For example, if the condition is common across three or more instances of training data, then the data analysis application 125 need not test the condition twice, and as such, removes the instance of training data from further consideration. This helps reduce computational complexity and processing time. Accordingly, if the condition is common, then block 403 passes to block 404, where the data analysis application 125 removes the condition from consideration. Conversely, if the condition is not common across instances, then block 403 passes to block 405.

At block 404, method 400 involves removing the instance from further consideration. Block 404 passes control to block 405.

At block 405, method 400 involves adding the condition to the list of conditions.

At block 406, method 400 involves determining whether there are more conditions to test in the instance of training data. If there are more conditions to examine in the instance of training data, then block 406 passes control back to block 402 and the process continues with another condition from the instance of training data. Conversely, if there are no more conditions to examine, then block 406 passes control to block 407 and determines whether there is more training data.

At block 407, method 400 involves determining whether there is more training data. If there are more instances of training data to check, then method 300 passes control back to block 401 and selects another instance of training data. If there are no more instances of training data, then method 400 ends.

As discussed with respect to block 305 of method 400, the data analysis application 125 generates a user segment from the conditions determined to be relevant. Different methods can be used to generate user segments, such as an a priori algorithm or a decision tree. In particular, the data analysis application 125 can optimize for different characteristics such as the coverage of a user segment, or rule, relative to the total training data set, or the number of rules, or a balance of rule coverage and number of rules.

The coverage of a rule, or cover ($R_1$) is the set of instances that the rule covers in the training data. For example, consider a rule that if input $X_i$ meets certain conditions, then the predictive model 175 will output $Y_i$. If the conditions for the rule are met in 90/100 of the instances of training data, i.e. ninety of the one-hundred training data instances meet the conditions of the rule, then the rule has 90% coverage. Ideally, the remaining 10% of the training data instances are covered with one or more other rules.

Precision is defined as the ratio of the number of instances in the correct cover to the number of instances in the cover, specifically $$\text{Precision}(R_i) = \frac{len(correctcover(R))}{len(\text{cover}(R))}.$$

As discussed, the data analysis application 125 may, in some cases, formulate rules which results in a near-complete understanding of the predictive model 175, but not a complete understanding. Accordingly, in a minority of cases, an input matching the conditions in the rule may not give the outcome given by the predictive model.

Figure 5:
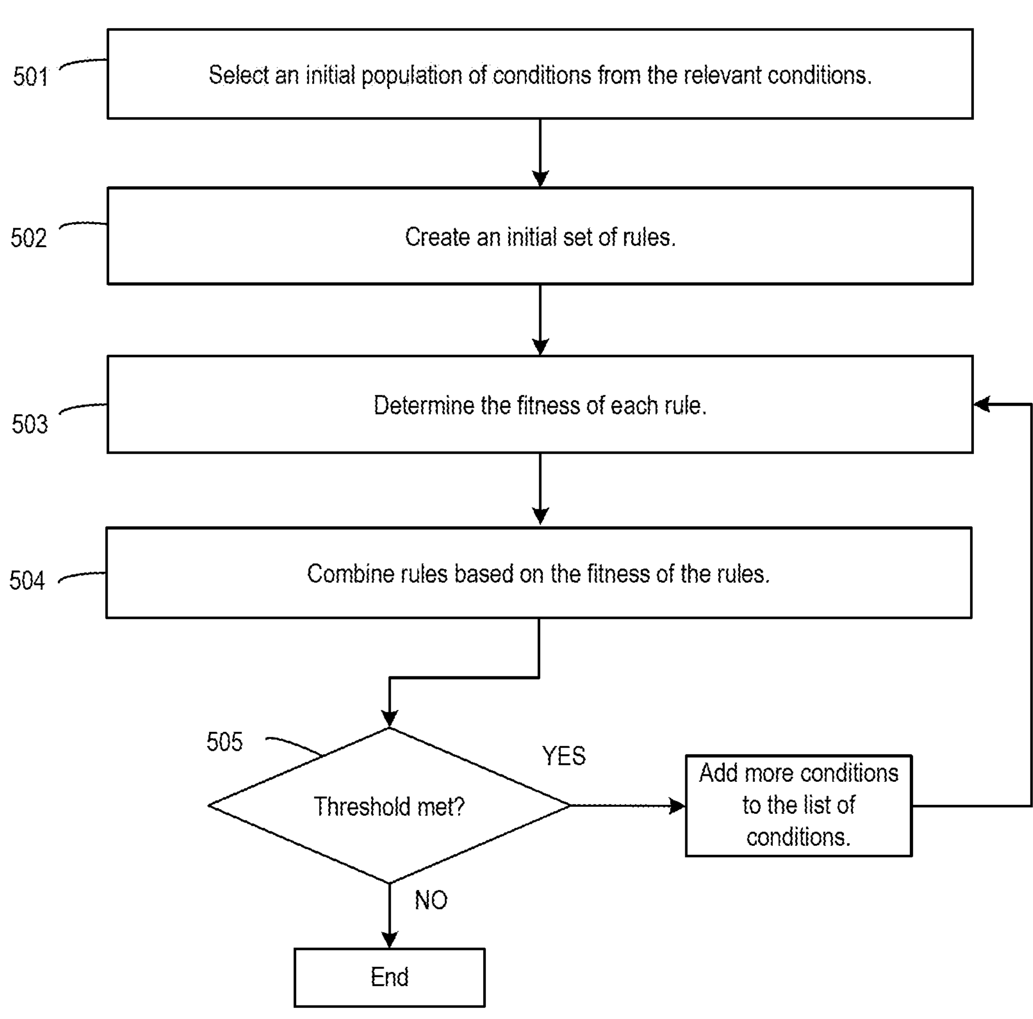
FIG. 5 depicts an example of using a genetic algorithm to determine user segments, according to certain embodiments of the present disclosure.

The data analysis application 125 can use a genetic algorithm to determine a user segment. For example, FIG. 5 depicts an example of using a genetic algorithm to determine user segments, according to certain embodiments of the present disclosure. User segments, or rules, are combinations of conditions. A genetic algorithm can be used to intelligently eliminate combinations of conditions which are not useful and further exploit combinations of conditions which are useful.

For example, the data analysis application 125 using a genetic algorithm starts with a population of conditions, much like a human population with a group of individuals. Each individual in the genetic algorithm represents a possible user segment. The initial set of conditions are random and may end up being critical or not critical to the final user segment. The data analysis application 125 iterates through the conditions, maintaining the useful conditions and disregarding the conditions that are not so useful. Upon completion, the data processing application 125 has determined a user segment.

At block 501, method 500 involves selecting an initial population of conditions. In an example, the conditions and associated relevance may be gender=male, (0.5); gender=female, (0.5); state=California, (0.2); state=New York, (0.3); 10<=age 20, (0.3); 30<=age<90, (0.7).

In some embodiments, method 500 may not evaluate all conditions, for example, to decrease the time taken to determine a user segment. In some embodiments, a random subset of the conditions generated at block 303 can be used.

At block 502, method 500 involves creating an initial set of user segments. A user segment, or rule, is a set of conditions. The initial set of user segments may be random. For example, one user segment may be "if gender=male and state=New York, then predict conversion." Similarly, another user segment may be "if gender=male and gender=female then predict no conversion." In this case, the user segment contains an internal conflict because gender cannot be both male and female. Such user segments are disregarded. The conditions that form the user segment evolve over the course of iterations. Different user segments need not have the same number of conditions.

A user segment may be represented by a bit string. Each bit in the bit string represents a condition, specifically, a value of 1 indicates that the condition is present in the user segment, whereas a value of 0 represents that the condition is not active in the rule. For example, for a set of user segment with 8 conditions, a bit string may be 01000001.

At block 503, method 500 involves determining the fitness of each user segment. The data analysis application 125 determines a fitness of the user segment based on the relevance of every condition used to form the user segment. Fitness, or suitability is a measure of the quality of the user segment.

Fitness can be measured in different ways. For example, the genetic algorithm can be scored using an F1-score. The F1-score captures both the concepts of precision and coverage. More specifically, the F1-score is defined as the harmonic mean of the precision and the class coverage:

$$F1score(R_i) = \frac{(2 * \text{Precision}(R_i) * ClassCoverage(R_i))}{\text{Precision}(R_i) + ClassCoverage(R_i)}.$$

Accordingly, the correct-cover for the model quantifies the accuracy. For example, if a user segment is defined as when input X consists of A=1 AND B=3, output Y is achieved, but in 1% of the cases, another factor, not represented in the conditions, affects the decision and the result does not match the actual predicted result, then the predictive model has a 99% correct-cover. More specifically, the correct-cover of a user segment is the set of instances $X_i$ such that $X_i$ is in the cover and the predicted output $Y_1$ of the user segment matches with the prediction of the predictive model 175 for input $X_i$.

Class coverage is defined as the ratio of the number of instances in the correct-cover to the number of instances in the training set that have been predicted by the classifier to have label $Y_i$. More specifically, class, or outcome coverage, is defined as $$ClassCoverage(R_i) = \frac{len\ (\text{correct-cover}(R_i))}{\begin{array}{c}\text{no of instances in the training} \\ \text{set having predicted outcome } yi\end{array}}.$$

Length is defined as the number of conditions that form a user segment. For example, if user segment $R_i$ requires that condition A and condition B be met, then user segment $R_i$ has a length of two. Because the length of a user segment can mean simplicity for the operator, in some embodiments, the genetic algorithm can optimize for length.

In some cases, the data analysis application 125 can determine that an instance of training data is covered by a first user segment with one outcome and a second user segment with an opposite outcome from the first user segment. Optimizing for precision can help minimize overlap.

At block 504, method 500 involves combining user segments based on the fitness of the user segments. As discussed, the genetic algorithm proceeds in a manner similar to evolution over time. The data analysis application 125 uses a fitness measurement determines whether to combine two user segments. The data analysis application 125 is more likely to select user segments that are "fit" for combination. If sufficiently "fit," then two user segments, the parents, are combined to make a new user segment, a child.

In other embodiments, the data analysis application 125 can stop after a certain number of iterations or after a certain minimum level of quality has been achieved. In yet further embodiments, the operator may specify to only look at a certain number of data sets in order to more quickly obtain a response. For example, the operator may ask for the data analysis application 125 to analyze the first 600 training data instances. Similarly, the operator can limit the data used by the model and the data analysis application 125 to a time period, e.g., over the last three months.

In yet further embodiments, a threshold may be used. For example, if the F1-score is above a threshold, then the data analysis application 125 keeps the user segment, otherwise the data analysis application 125 removes the user segment. Accordingly, the data analysis application 125 combines conditions that form good user segments and removes combinations of conditions that give less-than-optimum user segments.

At block 505, method 500 involves determining whether a threshold has been met. In some embodiments, the data analysis application 125 adds, exchanges and changes conditions until a stable set of conditions, or user segments, is reached. After a number of iterations, the set of user segments may stabilize. For example, a threshold may be that the F1-score of the current user segment does not represent a significant change from one iteration to the next. In other embodiments, the threshold can be a number of iterations.

FIG. 5 shows one method, but other methods are possible. For example, the greedy select method optimizes user segments for coverage but may generate a greater number of user segments than other methods. When using the greedy select method, data analysis application 125 optimizes class-level coverage. For example, the data analysis application 125 provides the user-segments with a desired coverage threshold. For example, the threshold may be 90% coverage if high-coverage is desired by the operator. The data analysis application 125 sorts the user segments by descending order of precision and adds the user segments to the final set of user segments until the desired level of coverage is met. Because the algorithm used is greedy, the size of the final set of user segments is bigger compared to what can be achieved with other approaches.

In other embodiments, the data analysis application 125 may use dynamic programming. More specifically, the data analysis application 125 can use a dynamic based approach to optimize the F-1 score of the set of user segments. The data analysis application 125 uses a bottom-up approach to build an optimal subset of user segments by analyzing a user segments and then incrementing the number of user segments by one. At each step, the data analysis application 125 computes the F1-score for two subsets of user segments, one containing the new user segment, one not containing the new user segment, and retains the subset with the higher F1-score. Additionally, the data analysis application 125 controls the length of the selected subset, which allows the operator to specify a desired number of conditions in a subset of user segments.

In some embodiments, the data analysis application 125 performs a post-processing step to the user segments. The generated user segments may contain redundancies. Accordingly, a post processing step is used to reduce redundant user segments. For example, the user segments are sorted in descending order of precision. Each sorted user segment is checked for redundancy. If the user segment is a subset of a user segments with greater precision, then the user segment with lesser precision is removed and is not further considered.

Figure 6:
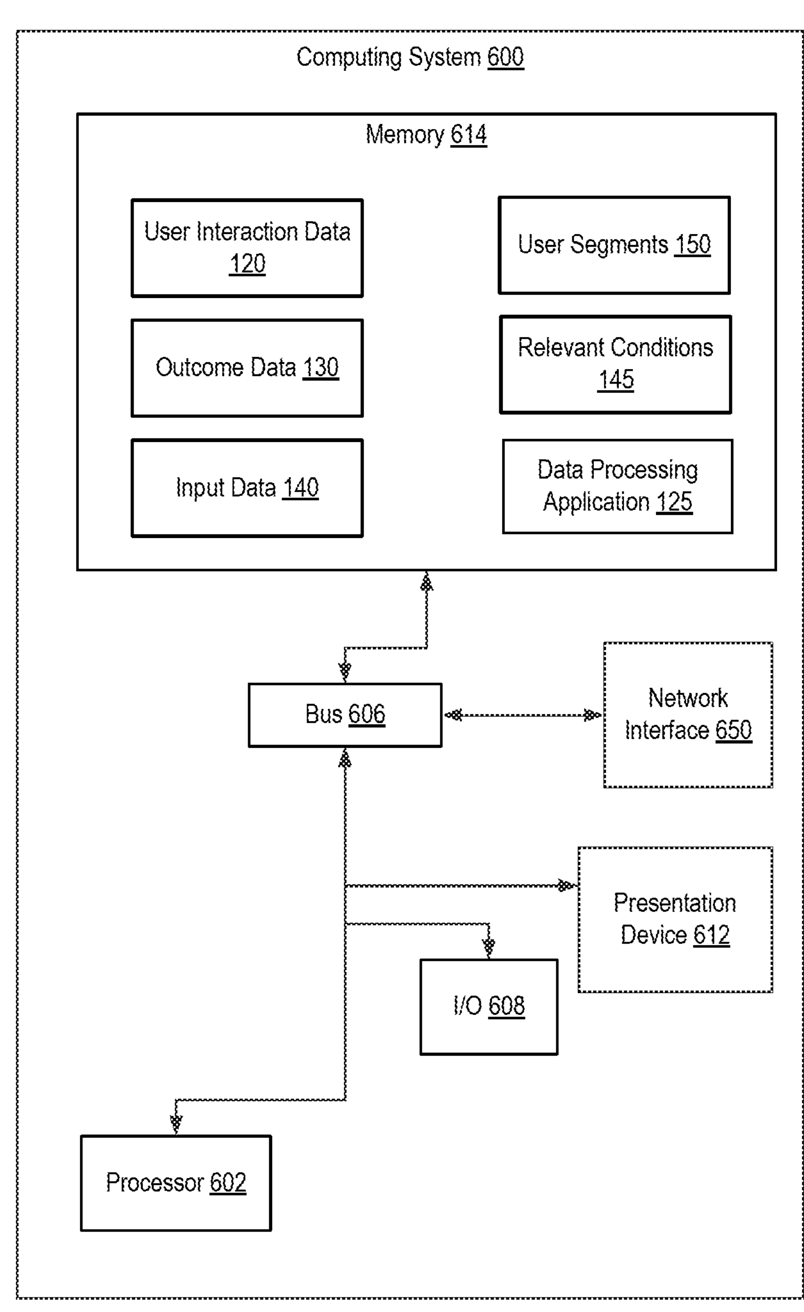
FIG. 6 depicts an example computing system for determining insights from a predictive model, according to certain embodiments of the present disclosure.

FIG. 6 depicts an example computing system for determining insights from a predictive model, according to certain embodiments of the present disclosure. Some of the components of the computing system 600 can belong to the computing device 101 of FIG. 1. For example, the data analysis application 125 may operate on the computing system 600. The computing system 600 includes one or more processors 602 communicatively coupled to one or more memory devices 614. The processor 602 executes computer-executable program code, which can be in the form of non-transitory computer-executable instructions, stored in the memory device 614, accesses information stored in the memory device 614, or both. Examples of the processor 602 include a microprocessor, an application-specific integrated circuit ("ASIC"), a field-programmable gate array ("FPGA"), or any other suitable processing device. The processor 602 can include any number of processing devices, including one.

The memory device 614 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices such as input or output devices. For example, the computing system 600 is shown with an input/output ("I/O") interface 608 that can receive input from input devices or provide output to output devices. A bus 606 can also be included in the computing system 600. The bus 606 can communicatively couple one or more components of the computing system 600 and allow for communication between such components.

The computing system 600 executes program code that configures the processor 602 to perform one or more of the operations described above with respect to FIGS. 1-5. The program code of the data analysis application 125, which can be in the form of non-transitory computer-executable instructions, can be resident in the memory device 614 or any suitable computer-readable medium and can be executed by the processor 602 or any other one or more suitable processor. Execution of such program code configures or causes the processor(s) to perform the operations described herein with respect to the computing device 101. In additional or alternative embodiments, the program code described above can be stored in one or more memory devices accessible by the computing system 600 from a remote storage device via a data network. The computing device 101 and any processes can use the memory device 614. The memory device 614 can store, for example, additional programs, or data such user interaction data 120, outcome data 130, input data 140, relevant conditions 145, or user segments 150, used by the applications executing on the processor 602 such as the data analysis application 125.

The computing system 600 also includes at least one network interface 650. The network interface 650 includes any device or group of devices suitable for establishing a wired or wireless data connection to one or more data networks. Non-limiting examples of the network interface 650 include an Ethernet network adapter, a modem, and/or the like. The computing system 600 is able to communicate with one or more other computing devices or computer-readable data sources via a data network using the network interface 650.

The computing system 600 includes a presentation device 612. A presentation device 612 can include any device or group of devices suitable for providing visual, auditory, or other suitable sensory output. Non-limiting examples of the presentation device 612 include a monitor, a speaker, a separate mobile computing device, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

What is claimed is:

1. A computer-implemented method for determining user segments created by a trained predictive model based on user behavioral data, the method comprising:

accessing, by a computing device, an outcome of interest and training data comprising a plurality of instances of user interaction data, each instance of the user interaction data associated with a user interaction within a computer network and comprising a plurality of attributes and an outcome associated with the user interactions, wherein the outcome of interest and the training data were previously used to train a trained predictive model;

generating, by the computing device, a set of conditions from the training data, each condition comprising an attribute and a range of values for the attribute;

generating, by the computing device, multiple instances of input data from the training data, wherein the multiple instances of input data are associated with the set of conditions, and wherein each instance of input data comprises at least one instance of user interaction data from the training data satisfying a corresponding condition;

determining, by the computing device, a set of relevant conditions from the set of conditions based on relevance to the outcome of interest according to the trained predictive model, wherein determining the set of relevant conditions comprises:

selecting a first condition related to a first attribute;

causing the trained predictive model to compute, using a first instance of the multiple instances of input data corresponding to the first condition, a first predicted outcome;

determining a first relevance of the first condition by comparing the outcome of interest to the first predicted outcome;

including the first condition in the set of relevant conditions, based on the first relevance;

selecting a second condition related to a second attribute;

causing the trained predictive model to compute, using a second instance of the multiple instances of input data corresponding to the second condition, a second predicted outcome;

determining a second relevance of the second condition by comparing the outcome of interest to the second predicted outcome; and excluding the second condition from the set of relevant conditions, based on the second relevance;

generating, by the computing device, a user segment associated with the set of relevant conditions; and presenting, by the computing device, the user segment to an interface.

2. The method of claim 1, wherein generating the set of conditions further comprises:

extracting each condition present in each instance of the user interaction data, and aggregating each condition into the set of conditions.

3. The method of claim 1, further comprising determining a relevance of the user segment based on a predicted outcome from the trained predictive model given the set of relevant conditions associated with the user segment.

4. The method of claim 3, further comprising:

generating a second user segment; and determining, based on the relevance of the user segment and a relevance of the second user segment, an optimal set of user segments, the optimal set of user segments comprising at least one of the user segment and the second user segment, wherein the optimal set of user segments are user segments that are most relevant to the outcome of interest.

5. The method of claim 4, further comprising:

determining, by the computing device, that the second user segment is redundant compared to the user segment; and removing, by the computing device, the second user segment from the optimal set of user segments.

6. The method of claim 4, further comprising processing the user segment to remove redundant or overlapping conditions.

7. The method of claim 4, wherein determining an optimal set of user segments further comprises:

creating a set of user segments, the set of user segments including the user segment and the second user segment;

determining a first metric for the user segment and a second metric for the second user segment, the first metric and the second metric based on user segment precision and coverage;

based on the first metric being higher than the second metric, retaining the user segment in the optimal set of user segments and removing the second user segment from the set of user segments; and providing the set of user segments as the optimal set of user segments.

8. The method of claim 4, wherein the determining the optimal set of user segments further comprises:

using a genetic algorithm to select an initial population of relevant conditions and create a set of user segments;

iteratively performing operations comprising:

determining a fitness score of each user segment in the set of user segments;

based on the fitness score, combining two of the user segments from the set of user segments into a new user segment; and combining two relevant conditions corresponding to the two of the user segments, to generate a combination of relevant conditions corresponding to the new user segment.

9. The method of claim 1, further comprising:

identifying, by the computing device, a set of ranges for numerical values within the training data; and converting numerical data into categorical data by replacing a numerical value with a range.

10. A system comprising:

a non-transitory computer-readable medium storing computer-executable program instructions for determining user segments created by a predictive model based on user behavioral data; and a processing device communicatively coupled to the non-transitory computer-readable medium for executing the computer-executable program instructions, wherein executing the computer-executable program instructions configures the processing device to perform operations comprising:

accessing an outcome of interest and training data comprising a plurality of instances of user interaction data, each instance of the user interaction data associated with a user interaction within a computer network and comprising a plurality of attributes and an outcome associated with the user interaction, wherein the outcome of interest and the training data were previously used to train a trained predictive model;

generating a set of conditions from the training data, each condition comprising an attribute and a range of values for the attribute;

generating multiple instances of input data from the training data, wherein the multiple instances of input data are associated with the set of conditions, and wherein each instance of input data comprises at least one instance of user interaction data from the training data satisfying a corresponding condition;

determining a set of relevant conditions from the set of conditions based on relevance to the outcome of interest according to the trained predictive model, wherein determining the set of relevant conditions comprises:

selecting a first condition related to a first attribute;

causing the trained predictive model to compute, using a first instance of the multiple instances of input data corresponding to the first condition, a first predicted outcome;

determining a first relevance of the first condition by comparing the outcome of interest to the first predicted outcome;

including the first condition in the set of relevant conditions, based on the first relevance;

selecting a second condition related to a second attribute;

causing the trained predictive model to compute, using a second instance of the multiple instances of input data corresponding to the second condition, a second predicted outcome;

determining a second relevance of the second condition by comparing the outcome of interest to the second predicted outcome and excluding the second condition from the set of relevant conditions, based on the second relevance;

generating a user segment associated with the set of relevant conditions; and presenting the user segment to an interface.

11. The system of claim 10, wherein generating the set of conditions further comprises:

extracting each condition present in each instance of the user interaction data, and aggregating each condition into the set of conditions.

12. The system of claim 10, wherein executing the computer-executable program instructions further configures the processing device to perform operations comprising determining a relevance of the user segment based on a predicted outcome from the trained predictive model given the set of relevant conditions associated with the user segment.

13. The system of claim 12, wherein executing the computer-executable program instructions further configures the processing device to perform operations comprising:

determining, based on the relevance of the user segment and a relevance of a second user segment, an optimal set of user segments, the optimal set of user segments comprising at least one of the user segment and the second user segment, wherein the optimal set of user segments are user segments that are most relevant to the outcome of interest.

14. The system of claim 13, wherein executing the computer-executable program instructions further configures the processing device to perform operations comprising:

determining that the second user segment is redundant compared to the user segment;

and removing the second user segment from the optimal set of user segments.

15. The system of claim 10, wherein executing the computer-executable program instructions further configures the processing device to perform operations comprising processing the user segment to remove redundant or overlapping conditions.

16. A non-transitory computer-readable storage medium storing computer-executable program instructions, wherein when executed by a processing device, the computer-executable program instructions cause the processing device to perform operations comprising:

accessing an outcome of interest and training data comprising a plurality of instances of user interaction data, each instance of the user interaction data associated with a user interaction within a computer network and comprising a plurality of attributes and an outcome associated with the user interaction, wherein the outcome of interest and the training data were previously used to train a trained predictive model;

generating a set of conditions from the training data, each condition comprising an attribute and a range of values for the attribute;

generating multiple instances of input data from the training data, wherein the multiple instances of input data is associated with the set of conditions, and wherein each instance of input data comprises at least one instance of user interaction data from the training data satisfying a corresponding condition;

determining a set of relevant conditions from the set of conditions based on relevance to the outcome of interest according to the trained predictive model, wherein determining the set of relevant conditions comprises:

selecting a first condition related to a first attribute;

causing the trained predictive model to compute, using a first instance of the multiple instances of input data corresponding to the first condition, a first predicted outcome;

determining a first relevance of the first condition by comparing the outcome of interest to the first predicted outcome;

including the first condition in the set of relevant conditions, based on the first relevance;

selecting a second condition related to a second attribute;

causing the trained predictive model to compute, using a second instance of the multiple instances of input data corresponding to the second condition, a second predicted outcome;

determining a second relevance of the second condition by comparing the outcome of interest to the second predicted outcome; and excluding the second condition from the set of relevant conditions, based on the second relevance;

generating a user segment associated with the set of relevant conditions; and presenting the user segment to an interface.

17. The non-transitory computer-readable storage medium of claim 16, wherein generating the set of conditions further comprises:

extracting each condition present in each instance of the user interaction data, and aggregating each condition into the set of conditions.

18. The non-transitory computer-readable storage medium of claim 16, wherein the computer-executable program instructions further cause the processing device to perform operations comprising determining a relevance of the user segment based on a predicted outcome from the trained predictive model given the set of relevant conditions associated with the user segment.

19. The non-transitory computer-readable storage medium of claim 18, wherein the computer-executable program instructions further cause the processing device to perform operations comprising:

determining, based on the relevance of the user segment and a relevance of a second user segment, an optimal set of user segments, the optimal set of user segments comprising at least one of the user segment and the second user segment, wherein the optimal set of user segments are user segments that are most relevant to the outcome of interest.

20. The non-transitory computer-readable storage medium of claim 19, wherein the computer-executable program instructions further cause the processing device to perform operations comprising:

determining that the second user segment is redundant compared to the user segment;

and removing the second user segment from the optimal set of user segments.

* * * * *